United States Patent
Kuroda et al.

(10) Patent No.: US 6,677,997 B1
(45) Date of Patent: Jan. 13, 2004

(54) AMPLIFYING SOLID-STATE IMAGING DEVICE, AND METHOD FOR DRIVING THE SAME

(75) Inventors: Takao Kuroda, Osaka (JP); Masayuki Masuyama, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/432,125

(22) Filed: Nov. 2, 1999

(30) Foreign Application Priority Data

Nov. 5, 1998 (JP) .......................................... 10-314603

(51) Int. Cl.$^7$ ............................ H04N 5/335; H04N 3/14
(52) U.S. Cl. ...................................... 348/308; 348/301
(58) Field of Search ................................ 348/308, 301, 348/302, 303, 304, 294; 250/208.1; 257/291, 292

(56) References Cited

U.S. PATENT DOCUMENTS

| | | | |
|---|---|---|---|
| 4,819,070 A | 4/1989 | Hynecek | |
| 5,331,421 A | 7/1994 | Ohzu et al. | |
| 5,631,704 A | 5/1997 | Dickinson et al. | |
| 5,771,070 A | 6/1998 | Ohzu et al. | |
| 6,046,466 A | * 4/2000 | Ishida et al. | ............... 348/301 |

FOREIGN PATENT DOCUMENTS

| | | |
|---|---|---|
| JP | 48-78888 | 10/1973 |
| JP | 63-76583 | 4/1988 |
| JP | 2-107075 | 4/1990 |
| JP | 4-86167 | 3/1992 |
| JP | 5-227487 | 9/1993 |
| JP | 5-227489 | 9/1993 |
| JP | 247535 | 9/1997 |
| JP | 9-247353 | 9/1997 |
| JP | 9-247537 | 9/1997 |
| JP | 9-247546 | 9/1997 |
| JP | 10-145681 | 5/1998 |
| JP | 10-233964 | 9/1998 |

* cited by examiner

Primary Examiner—Aung S. Moe
(74) Attorney, Agent, or Firm—McDermott, Will & Emery

(57) ABSTRACT

A plurality of pixels, each including a photodiode that can make a transition from a first potential state (reset state) into a second potential state variable with the quantity of incident light or vice versa, are provided. A unit compensator includes first and second storage devices implementable as respective MOS capacitors. The first storage device stores thereon charge in a quantity proportional to a difference between a signal potential $\phi s$ corresponding to the second potential state of each pixel and a reference potential $\phi 0$. The second storage device stores thereon charge in a quantity proportional to a difference between a fixed potential $\phi d$ and the reference potential $\phi 0$. When a reset potential $\phi r$ is supplied from an associated pixel, these storage devices are short-circuited with each other, thereby transferring charge in a quantity proportional to a potential difference ($\phi s - \phi r$) between these storage devices. After these storage devices have been electrically isolated from each other, the potential difference ($\phi s - \phi r$) is sensed based on the quantity of residual charge in the second storage device and then output. In this manner, a variation in threshold voltage among the amplifying transistors within the pixels can be compensated for.

11 Claims, 9 Drawing Sheets

AMPLIFYING SOLID-STATE IMAGING DEVICE, AND METHOD FOR DRIVING THE SAME

BACKGROUND OF THE INVENTION

The present invention relates to an amplifying solid-state imaging device and a method for driving the same.

In recent years, demand for a device used for sensing the one- or two-dimensional distribution of light quantity has tremendously increased. In the field of solid-state imaging devices, a so-called "amplifying solid-state imaging device" has been an object of vigorous research and development these days. Such an amplifying solid-state imaging device includes a plurality of pixels, each of which includes a photoelectric transducing section, a storage section and a sensing circuit. The photoelectric transducing section receives incoming light and photoelectrically converts the energy of the light into electrical energy to create signal charge. The storage section stores the signal charge thereon. The sensing circuit includes an amplifying transistor for outputting a signal in accordance with the quantity of the signal charge. The storage section is connected to a control terminal section of the amplifying transistor (e.g., gate electrode of an MOS transistor, base of a bipolar transistor, etc). An output value of the sensing circuit is controlled using a potential at the storage section, which is variable with the quantity of signal charge.

Such an amplifying solid-state imaging device includes a plurality of amplifying transistors, each functioning as a sensing circuit, for the same number of pixels. Even if these amplifying transistors are formed within a single device or on an identical substrate by the same process, the characteristics of these transistors are not totally uniform. For example, if the threshold voltages Vt are variable among these transistors functioning as sensing circuits, then output values thereof are also variable, even though quantities of incoming light received by respective photoelectric transducing sections and resulting potentials at respective control terminal sections are equal to each other. As a result, spatially fixed pattern noise (FPN) is created, which considerably deteriorates the resultant image quality.

SUMMARY OF THE INVENTION

An object of the present invention is providing (1) an amplifying solid-state imaging device that can read out information from a storage section more accurately and rapidly by compensating for the effects produced by a variation in characteristics of amplifying transistors as sensing circuits for respective pixels irrespective of the quantity of light received and (2) a method for driving the device.

To achieve this object, the present invention provides unit compensators, each including: first and second storage devices implementable as MOS capacitors; and a switching device for electrically connecting or disconnecting these storage devices to/from each other, for respective columns of pixels.

Specifically, an amplifying solid-state imaging device according to the present invention includes: a photoelectric transducing section changing from a first potential state corresponding to a reset operation into a second potential state variable with an intensity of incident light or vice versa; an amplifier for sensing the first and second potential states of the photoelectric transducing section, thereby outputting first and second signals, respectively; and a compensator for receiving the first and second signals from the amplifier and outputting a third signal. The compensator includes: a first storage device implemented as an MOS capacitor with first and second electrodes; a second storage device implemented as another MOS capacitor with first and second electrodes; means for applying a fixed potential to the first electrode of the second storage device; a switching device for electrically connecting or disconnecting the second electrodes of the first and second storage devices to/from each other; means for applying a signal potential, corresponding to the second signal, to the first electrode of the first storage device; means for supplying charge to the respective second electrodes of the first and second storage devices such that the same reference potential is applied to the second electrodes of the first and second storage devices; means for applying a reset potential, corresponding to the first signal, to the first electrode of the first storage device instead of the signal potential; means for turning the switching device ON such that while the reset and fixed potentials are applied to the first electrodes of the first and second storage devices, respectively, charge is transferred between the respective second electrodes of the first and second storage devices to equalize potentials at the respective second electrodes of the first and second storage devices with each other; and means for outputting the third signal, corresponding to a quantity of charge stored on the second storage device, with the switching device turned OFF after the charge has been transferred.

In one embodiment of the present invention, the switching device is implementable as an MOS transistor with a gate electrode, and the gate electrode of the switching device preferably overlaps partially with the respective first electrodes of the first and second storage devices. In this particular embodiment, the gate electrode of the switching device and the respective first electrodes of the first and second storage devices are preferably formed out of respective polysilicon films deposited over a silicon substrate with an insulating film interposed therebetween.

In another embodiment, the charge supply means may include means for supplying the charge to the second electrode of the second storage device through the second electrode of the first storage device while the switching device is turned ON. Alternatively, the charge supply means may include means for supplying the charge to the second electrode of the first storage device through the second electrode of the second storage device while the switching device is turned ON.

In still another embodiment, the amplifier may be an amplifying transistor, the current drivability of which is variable with the potential state at the photoelectric transducing section. The imaging device may further include a load device for generating potential signals, corresponding to a current flowing through the amplifying transistor, as the first and second signals. In still another embodiment, the first electrodes of the first and second storage devices are preferably formed by a different process from an electrode of the amplifier.

DETAILED DESCRIPTION OF THE INVENTION

Hereinafter, embodiments of an amplifying solid-state imaging device according to the present invention will be described with reference to the accompanying drawings.

EMBODIMENT 1

Figure 1:
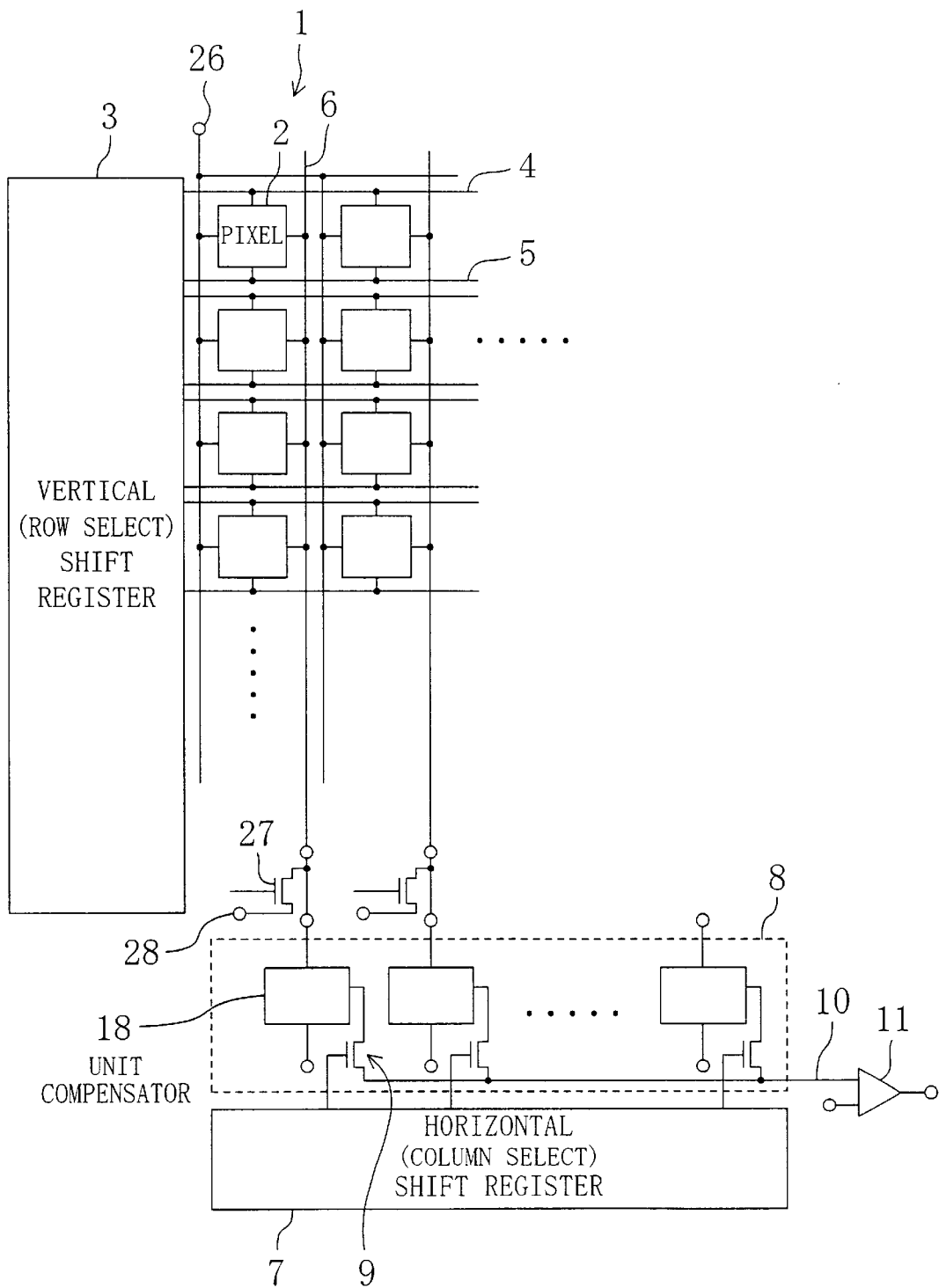
FIG. 1 is a block diagram illustrating a schematic arrangement of an amplifying solid-state imaging device according to the present invention.

FIG. 1 illustrates a schematic arrangement of an amplifying solid-state imaging device 1 according to the present invention. As shown in FIG. 1, the device 1 includes a plurality of pixels 2 arranged in matrix, i.e., in columns and rows, within an imaging area of a semiconductor substrate of single crystal silicon. In the illustrated embodiment, the respective numbers of rows and columns are represented by N and M, both of which are positive integers equal to or larger than two. In a typical solid-state imaging device, N and M are chosen from the range of 50 to 2,000. Each of these pixels 2 includes a photoelectric transducing section like a photodiode and a storage section (both of these sections are not shown in FIG. 1). Responsive to light incident on each photoelectric transducing section, a storage section, associated with the photoelectric transducing section, can receive information, corresponding to the intensity of the incoming light, from the photoelectric transducing section and store the information as a "potential" or "charge quantity". Although each photoelectric transducing section is in a first potential state during resetting, a state transition subsequently takes place in the section from the first into a second potential state in response to the incident light. The second potential state is represented by a level variable with the intensity of the incoming light. A level difference between the first and second potential states corresponds to the quantity of the light that has entered the pixel 2 after resetting. A more detailed internal configuration of each pixel 2 will be described later.

The device 1 includes a plurality of lines and circuits for selecting and accessing a particular one from the great number of pixels 2. These lines, circuits, transistors constituting respective pixels and so on are formed on a substrate by various techniques similar to well known ones for fabricating a semiconductor integrated circuit.

In this embodiment, a vertical (row select) shift register 3 is electrically connected to all of the pixels 2 through plural pairs of reset and row select lines 4 and 5. Each single reset line 4 is connected to all of the pixels 2 belonging to a single row associated with the reset line 4. Similarly, each single row select line 5 is also connected to all of the pixels 2 belonging to a single row associated with the row select line 5. That is to say, the number of the pairs of lines 4 and 5, extending from the vertical shift register 3, is equal to the number of the rows of pixels 2 in the matrix.

To select a particular one of the rows, the vertical shift register 3 selectively changes a potential on a row select line 5 associated with the particular row from logically "Low" into "High", for example. In this case, the potentials on the other row select lines 5 associated with the remaining rows are held at logically "Low". As a result, a potential, corresponding to the logically "High" state, is supplied to the respective control terminals of switching devices (not shown in FIG. 1) in all the pixels 2 included in the particular row, thereby turning these switching devices ON. Upon the activation of the switching devices, potentials, corresponding to the information that has been stored in respective storage sections on the selected row, appear on associated vertical signal lines 6. In this case, the storage section of each pixel 2 is electrically disconnected from an associated vertical signal line 6 on the remaining rows other than the selected one. The configuration and operation of a circuit for sensing information this way will be described in greater detail later.

The information, which has been stored in the storage sections of all the pixels 2 included in a selected row, is output to all the corresponding vertical signal lines 6 and then read out column by column by a horizontal (column select) shift register 7. To read out information from the respective columns, a first power supply terminal ($V_{dd}$) 26, load devices 27 for the respective columns, and a second power supply terminal ($V_{ss}$) 28 are provided.

The imaging device 1 according to this embodiment includes a compensator 8 for reproducing information more accurately by compensating for the potential information read out from the respective pixels 2. The compensator 8 is subdivided into the number M of unit compensators 18 associated with the respective columns. Each of these unit compensators 18 can create and hold charge in a quantity corresponding to a difference between the signal level of the data read out and a signal level during resetting. Accordingly, even if the "signal levels" of the signal potentials on the vertical signal lines 6 are not equal to each other but variable among the respective columns, such a variation can be compensated for and offset with similarly varying signal potentials during resetting. As a result, information can be reproduced with a reduced variation.

The respective output sections of the number M of unit compensators 18 are connected to a single horizontal signal line 10 via respective switching devices 9. The respective control terminals-of these switching devices 9 (e.g., gate electrodes of MOS transistors) are connected to the horizontal shift register 7. The horizontal shift register 7 selectively turns ON only one of the number M of switching devices 9 at a time. Accordingly, the information, which has been read out simultaneously from the number M of pixels 2 belonging to a selected row, is sequentially supplied column by column onto the horizontal signal line 10 via the compensator 8. The information is ultimately output as potential information (pixel information) through an output buffer (output amplifier) 11.

Figure 2:
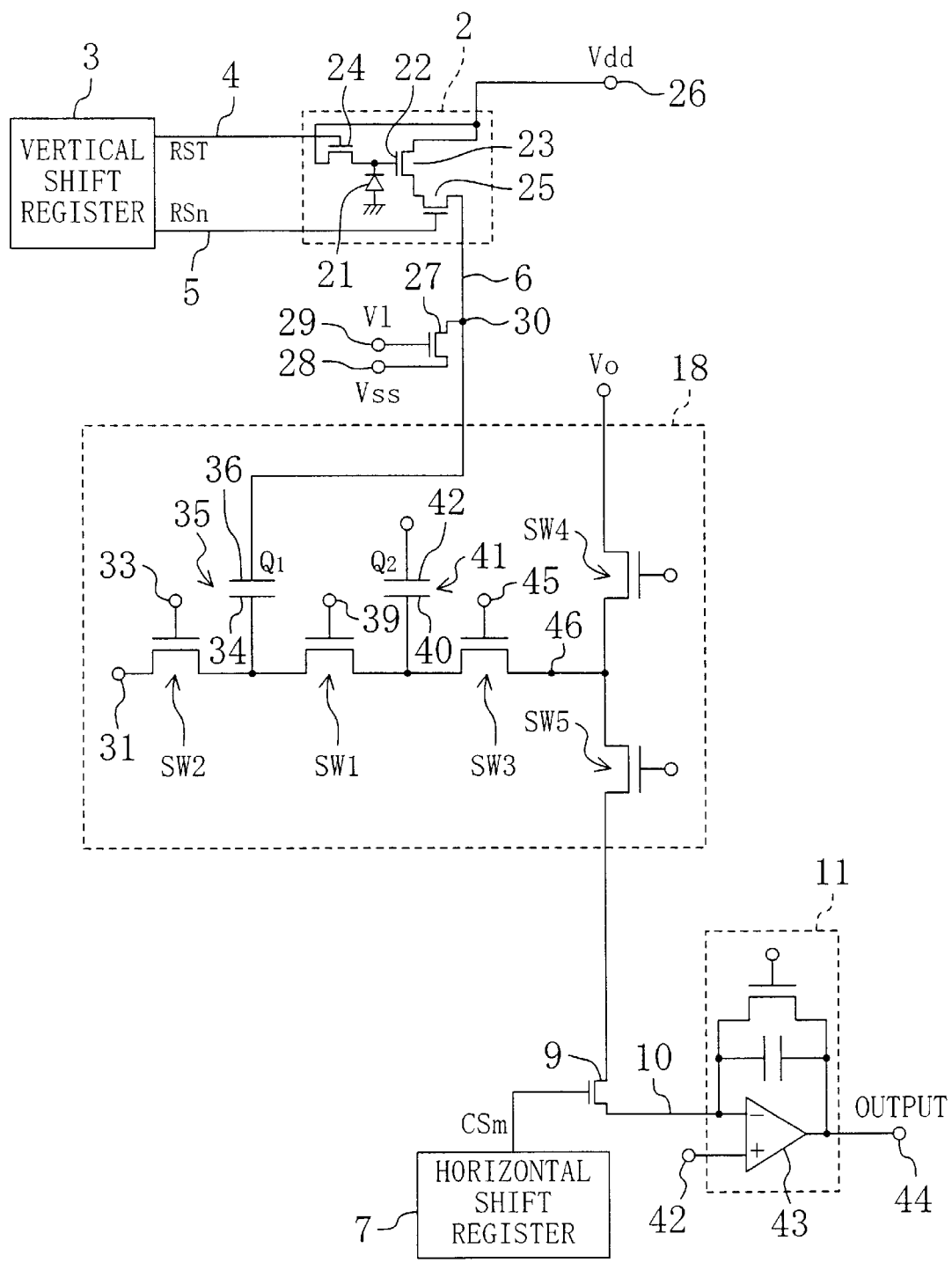
FIG. 2 is a circuit diagram illustrating in detail part of the device shown in FIG. 1.

Next, the configuration and operation of each unit compensator 18 will be detailed with reference to FIG. 2. FIG. 2 is a circuit diagram illustrating a unit compensator 18 and associated other components in the imaging device 1.

The unit compensator 18 is connected to a plurality of pixels 2 belonging to an associated column. Although just one pixel 2 is illustrated in FIG. 2, a plurality of such pixels 2, which are arranged in line, are actually connected to the single unit compensator 18 associated with the column (see FIG. 1). Hereinafter, the relationship between a representative pixel 2 and a unit compensator 18 associated with the pixel 2 will be described for the sake of simplicity.

As shown in FIG. 2, the pixel 2 includes a photodiode 21 and an MOS transistor 23, whose gate electrode 22 is connected to the photodiode 21. The photodiode 21 is implementable as a pn junction diode formed in a silicon substrate, for example, and can function as both a photoelectric transducing section for creating signal charge by photoelectrically converting incident light into electrical energy and a storage section for storing the signal charge thereon. The MOS transistor 23 may have an ordinary MOS structure including channel, source and drain regions in a silicon substrate, for example. The MOS transistor 23 functions as a driver of a sensing circuit. The sensing circuit plays an important role in amplifying and reading out a tiny variation in potential state of the photodiode 21. In the illustrated embodiment, no special capacitor is inserted between the gate electrode 22 of the MOS transistor 23 and the photodiode 21. Optionally, a capacitor may be inserted therebetween. In such a case, the capacitor inserted functions as a storage section for storing the signal charge thereon.

The pixel 2 further includes a resetting device 24 and a switching device 25. The resetting device 24 is an MOS transistor, whose gate electrode is connected to an associated reset line 4. The drain of the MOS transistor 24 is connected to the first power supply terminal ($V_{dd}$) 26, while the source thereof is connected to the photodiode 21. When the potential on the reset line 4 shown in FIG. 2 is selectively changed by the vertical shift register 3 from logically "Low" into "High", the resetting device 24 turns ON. As a result, a supply potential is provided from the first power supply terminal 26 to the photodiode 21. The potential state at the photodiode 21, i.e., the potential state at the gate electrode 22 of the amplifying transistor 23, is compellingly reset at a value determined by the supply potential $V_{dd}$ applied to the first power supply terminal 26. In this specification, the potential state at the photodiode 21 when such a reset operation is completed is defined as a "first potential state". After the reset operation is over, the potential at the photodiode 21 gradually varies with the intensity of light received by the pixel 2. In this specification, the potential state at the photodiode 21 in such a situation is defined as a "second potential state". It is because carriers are created due to the photoelectric conversion function of the photodiode 21 and stored on the photodiode 21 that the potential state at the photodiode 21 is variable with the incidence of light.

The switching device 25 in the pixel 2 is an MOS transistor, whose gate electrode is connected to the associated row select line 5. The source of the MOS transistor 25 is connected to the source of the amplifying transistor 23, while the drain thereof is connected to the associated vertical signal line 6. When the potential on the row select line 5 shown in FIG. 2 is selectively changed by the vertical shift register 3 from logically "Low" into "High", the switching device 25 turns ON. As a result, current flows from the first power supply terminal ($V_{dd}$) 26 through the amplifying transistor 23, switching device 25, vertical signal line 6 and load device 27 into the second power supply terminal ($V_{ss}$) 28. In this case, the potential on the vertical signal line 6 is variable with the potential state at the photodiode 21 (i.e., the potential at the gate electrode 22 of the amplifying transistor 23) and with the threshold voltage Vt of the amplifying transistor 23. Accordingly, the potential on the vertical signal line 6 has a level variable with the second potential state of the photodiode 21. However, if the threshold voltages of the amplifying transistors 23 are different from each other among respective pixels on the row, then potentials at various levels appear on the vertical signal lines 6 even though the second potential state is the same.

The unit compensator 18 includes first and second storage devices 35 and 41, which are connected together via a switching device SW1. In the illustrated embodiment, the first storage device 35 is an MOS capacitor with a pair of (or first and second) electrodes 36 and 34. The first electrode 36 of the first storage device 35 may be formed out of a polysilicon film deposited over a silicon substrate with an insulating film interposed therebetween. The first electrode 36 is electrically connected to the vertical signal line 6 and can receive a signal potential φs corresponding to the second potential state of the photoelectric transducing section through the vertical signal line 6. The second electrode 34 of the first storage device 35 is herein the silicon substrate and receives charge from a charge supply node 31 via a switching device (n-channel MOS transistor) SW2. While the switching device SW2 is conducting, the potential at the second electrode 34 is equal to a reference potential φ0. The charge supply node 31 is formed out of an n-type doped layer and functions as the source region of the switching device SW2. If the first storage device 35 receives the charge from the charge supply node 31 via the switching device SW2 while the signal potential φs is being supplied to a signal input node 30 of the unit compensator 18, then the first storage device 35 will store charge in a quantity proportional to a potential difference (φs−φ0) between the signal potential φs and the reference potential φ0.

In the illustrated embodiment, the second storage device 41 is also an MOS capacitor with a pair of (or first and second) electrodes 42 and 40. The first electrode 42 of the second storage device 41 may also be formed out of a polysilicon film deposited over a silicon substrate with an insulating film interposed therebetween. The first electrode 42 receive a fixed potential φd. The second electrode 40 of the second storage device 41 may also be the silicon substrate, too. The second electrode 40 is electrically connected to a power supply Vo through switching devices SW3 and SW4 and to the horizontal signal line 10 through switching devices SW3, SW5 and 9.

While the switching device SW1 is conducting, the second electrode 40 of the second storage device 41 is electrically connected to the second electrode 34 of the first storage device 35. In this state, charge can be exchanged between these electrodes 40 and 34. On and after the switching device SW1 turns ON while the second electrode 34 of the first storage device 35 is receiving the reference potential φ0 from the charge supply node 31, the second electrode 40 of the second storage device 41 can also be supplied with the charge from the charge supply node 31. The second storage device 41 will store charge in a quantity proportional to a potential difference (φd−φ0) between the fixed potential φd and the reference potential φ0.

When a reset operation is started, a reset operation potential φr, corresponding to the first potential state of the photoelectric transducing section, is output onto the vertical signal line 6 and then provided to the first electrode 36 of the first storage device 35. In this case, the switching device SW1 short-circuits the respective second electrodes 34 and 40 of the first and second storage devices 35 and 41 with each other. As a result, charge in a quantity proportional to a potential difference (φs−φr) between the signal potential φs and the reset operation potential φr can be transferred from the second to the first storage device 41 to 35. Once the charge has been transferred, the switching device SW1 operates to electrically isolate the respective second electrodes 34 and 40 of the first and second storage devices 35 and 41 from each other.

In FIG. 2, the gate electrodes of the load device 27 and switching devices Sw2, SW1 and SW3 are identified by the reference numerals 29, 33, 39 and 45, respectively. An output node of the unit compensator 18 may be formed out of an n-type doped layer 46. An integrating capacitor, a resetting transistor and an operational amplifier 43 constitute the output amplifier 11. The operational amplifier 43 has a non-inverting input terminal 42 and an output terminal 44.

Figure 3:
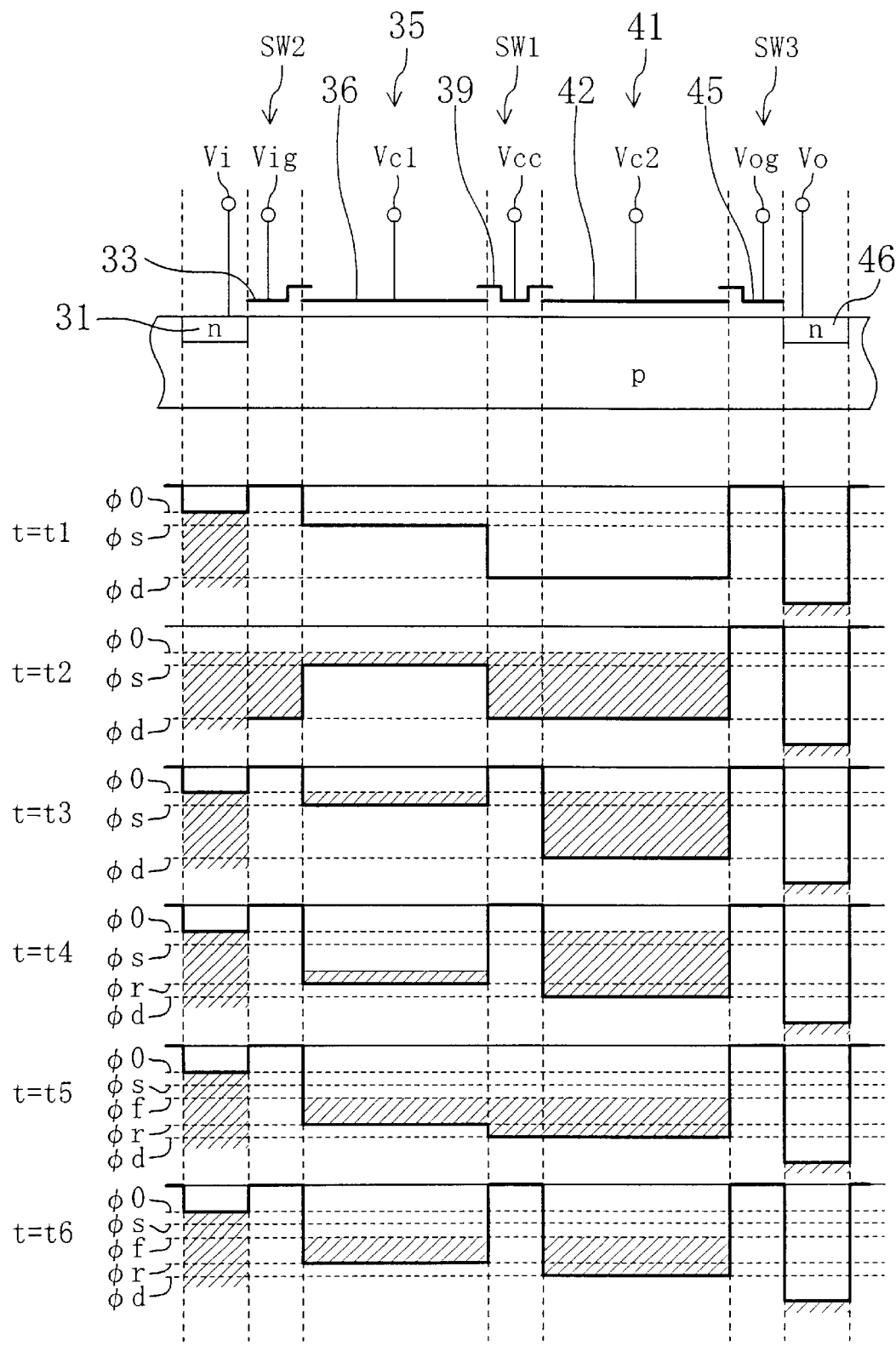
FIG. 3 illustrates an exemplary operation of the unit compensator shown in FIG. 2.

Next, the operation of the unit compensator 18 will be described in further detail with reference to FIG. 3. FIG. 3 schematically illustrates a cross section of a region of the silicon substrate where the unit compensator 18 is formed and surface potential profiles in that region. As shown in FIG. 3, the conductivity type of the silicon substrate is p-type. Potentials Vi, Vig, Vc1, Vcc, Vc2, Vog and Vo are applied to the n-type doped layer 31, gate electrode 33 of the switching device SW2, first electrode 36 of the first storage device 35, gate electrode 39 of the switching device SW1, first electrode 42 of the second storage device 41, gate electrode 45 of the switching device SW3 and n-type doped layer 46, respectively. In FIG. 3, hatched portions indicate regions where charges (electrons) exist.

First, at a time t1 or before, the potential Vcc is raised to logically "High" level to turn the switching device SW1 ON, thereby electrically connecting the respective second electrodes 34 and 40 of the first and second storage devices 35 and 41 with respective capacitances C1 and C2. As a result, charge can be transferred between these electrodes 34 and 40. At this point in time, since the potentials Vig and Vog are both held logically "Low", the switching devices SW2 and SW3 are kept OFF.

At the time t1, the signal potential Vc1 is supplied to the first electrode 36 of the first storage device 35 through the vertical signal line 6. As a result, a surface region of the silicon substrate facing the first electrode 36 of the first storage device 35 comes to show the potential φs. At this point in time, the fixed potential Vc2 is supplied to the first electrode 42 of the second storage device 41. As a result, a surface region of the silicon substrate facing the first electrode 42 of the second storage device 41 comes to show the potential φd. On the other hand, since the fixed potential Vi is supplied to the n-type doped layer 31 as the charge supply node, the surface potential of the n-type doped layer 31 is held at the reference potential φ0. It is noted that from the time t1 through the time t6, the fixed potentials Vi, Vc2 and Vo will be continuously applied to the charge supply node 31, the first electrode 42 of the second storage device 41 and the n-type doped layer 46, respectively.

The time t1 is a certain point in time before a resetting pulse is applied during a horizontal retrace interval. The signal potential Vc1 supplied to the input node of the unit compensator 18 at the time t1 is a value (output value) obtained by getting the second potential state at the photodiode 21 within an associated pixel 2 sensed by the sensing circuit. If the threshold voltages of the MOS transistors 23 functioning as drivers are different from each other among respective pixels 2 belonging to a certain row, the signal potentials Vc1 appearing on associated vertical signal lines 6 might be variable by about ±10% even if light of the same intensity is being incident on all of these pixels 2.

Next, at a time t2, the potential Vig has been raised to logically "High" state, thereby turning the switching device SW2 ON. At this point in time, the switching device SW1 is kept ON, while the switching device SW3 is kept OFF. As a result, charge is supplied from the charge supply node 31 to both the first and second storage devices 35 and 41.

Subsequently, at a time t3, the potentials Vcc and Vig have been decreased to logically "Low" state, thereby turning the switching devices SW1 and SW2 OFF. At this point in time, the switching device SW3 is kept OFF. As a result, charge in a quantity Q1 proportional to a potential difference (φs−φ0) between the signal potential φs and the reference potential φ0 is stored on the first storage device 35. On the other hand, charge in a quantity Q2 proportional to a potential difference (φd−φ0) between the fixed potential φd and the reference potential φ0 is stored on the second storage device 41.

The relationship between the charge quantity Q1 and the potential difference (φs−φ0) is represented by the following Equation (1):

$$Q1 = C1(\phi s - \phi 0) \tag{1}$$

The relationship between the charge quantity Q2 and the potential difference (φd−φ0) is represented by the following Equation (2):

$$Q2 = C2(\phi d - \phi 0) \tag{2}$$

A time t4 is a certain point in time when a resetting pulse is applied (or just after the pulse has been applied) during the horizontal retrace interval. The signal potential Vc1 supplied to the input node of the unit compensator 18 at the time t4 is a value obtained by getting the first potential state at the photodiode 21 within an associated pixel 2 sensed by the sensing circuit. When the signal potential Vc1 is supplied to the first electrode 36 of the first storage device 35 through the vertical signal line 6, a surface region of the silicon substrate facing the first electrode 36 of the first storage device 35 increases its level from φs to φr. If the threshold voltages of the amplifying transistors 23 are different from each other among respective pixels 2 belonging to a certain row, the signal potentials Vc1 appearing on associated vertical signal lines 6 might be variable by about ±10% even if the first potential state is compulsorily defined at the same level.

At the time t4, the switching devices SW1, SW2 and SW3 are all kept OFF. Accordingly, the first storage device 35 still retains the charge Q1 without being provided with any charge from anywhere, although the potential at the first electrode 36 changes.

Subsequently, at a time t5, the potential Vcc has been raised to logically "High" level again, thereby turning only the switching device SW1 ON. As a result, part of the charge that has been stored on the second storage device 41 is transferred to the first storage device 35, and the surface potential of the silicon substrate becomes φf.

Then, at a time t6, the switching device SW1 has been turned OFF again. As a result, charges in respective quantities Q1' and Q2' are stored on the first and second storage devices 35 and 41, respectively.

The relationship between the charge quantity Q1' and the potential difference (φr−φf) is represented by the following Equation (3):

$$Q1' = C1(\phi r - \phi f) \tag{3}$$

The relationship between the charge quantity Q2' and the potential difference (φd−φf) is represented by the following Equation (4):

$$Q2' = C2(\phi d - \phi f) \tag{4}$$

Since a charge conservation equation Q1+Q2=Q1'+Q2' is met, the following Equation (5) is derived from Equations (1) through (4);

$$C1(\phi s - \phi 0) + C2(\phi d - \phi 0) = C1(\phi r - \phi f) + C2(\phi d - \phi f) \tag{5}$$

Equation (5) is modifiable as:

$$\phi f = (\phi r - \phi s) \cdot C1/(C1+C2) + \phi 0 \quad (6)$$

Based on Equations (4) and (6), the charge quantity Q2' is given by the following Equation (7):

$$Q2' = Q2 - (\phi r - \phi s) \cdot C1 \cdot C2/(C1+C2) \quad (7)$$

The second term on the right side of Equation (7) represents the quantity of charge ΔQ flowing from the second into first storage device 41 into 35 at the time t5. As can be seen from Equation (7), the charge quantity ΔQ is proportional to the difference ($\phi r - \phi s$) between potentials output onto the vertical signal line 6, i.e., proportional to a value with its variable factor due to the variation in characteristics of transistors compensated for. Accordingly, if the quantity Q2' of charge stored on the second storage device 41 is sensed at the output amplifier 11 by turning the switching devices SW3, SW5 and 9 ON, then an output proportional to ($\phi r - \phi s$) can be obtained. In this case, it is clear that the second storage device 41 can be depleted easily after the charge has been read out therefrom, considering the structure of the device. This is advantageous because no thermal noise is generated.

Figure 4:
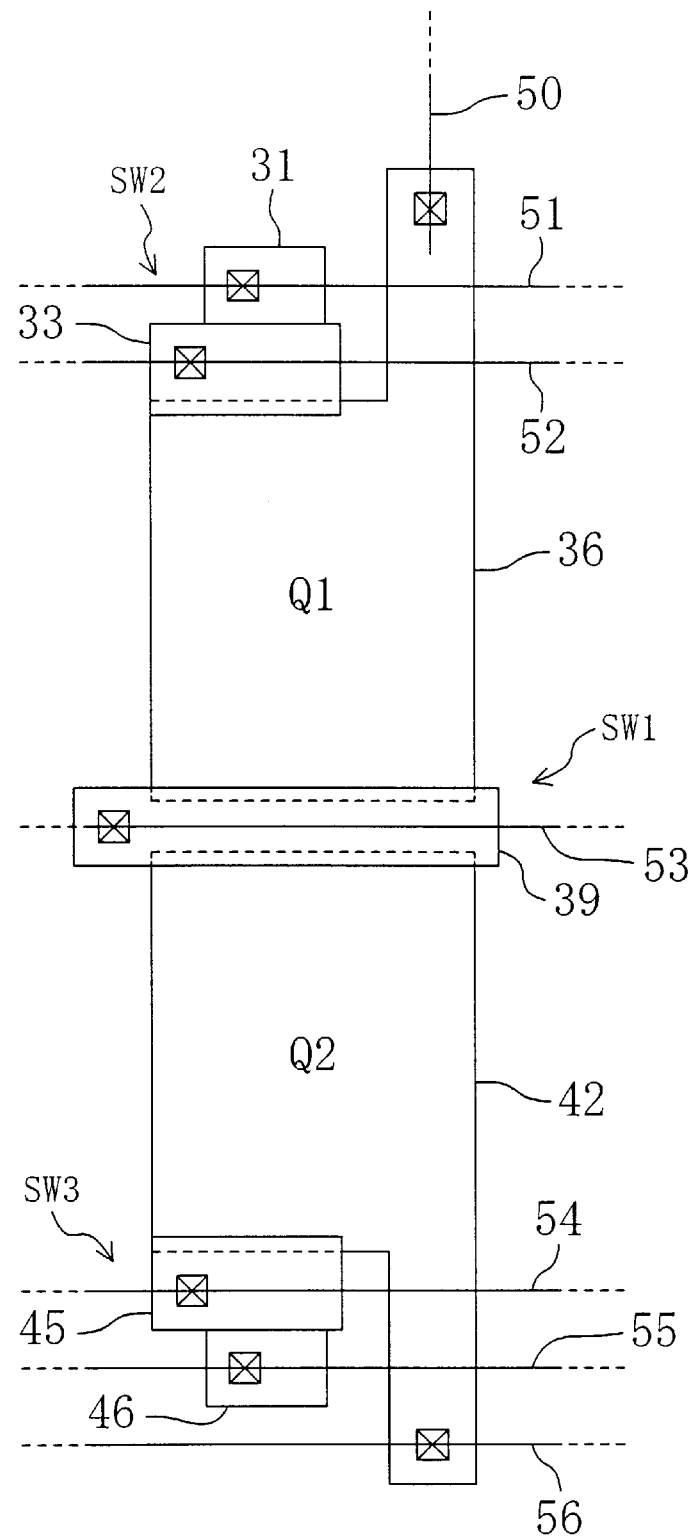
FIG. 4 is a plan view illustrating an exemplary layout for the unit compensator shown in FIG. 2.

FIG. 4 schematically illustrates an exemplary planar layout for the switching devices SW1, SW2 and SW3 and the respective first electrodes 36 and 42 of the first and second storage devices 35 and 41 in a unit compensator 18 belonging to a certain column. A vertical line 50 and horizontal lines 51 through 56 are illustrated in FIG. 4. The line 50 corresponds to the vertical signal line 6. Each of the lines 51 through 56 interconnects associated sections on respective columns together or supplies substantially the same potential to associated sections of the unit compensators 18 belonging to all the columns at the same time. In contrast, different potentials appear on the lines 50 associated with the respective columns. Each of these lines 50 through 56 may be made of aluminum (Al), for example, and in contact with the doped layer 31, 46, etc. These aluminum lines are illustrated as solid lines for the sake of simplicity. As shown in FIG. 4, the electrodes 36 and 42 of the storage devices 35 and 41 are formed out of respective polysilicon films at a first layer, while the gate electrodes 33, 39 and 45 of the respective switching devices SW2, SW1 and SW3 are formed out of respective polysilicon films at a second layer. In addition, the gate electrode 33 of the switching device SW2 partially overlaps with the first electrode 36 of the first storage device 35. The first electrode 36 of the first storage device 35 overlaps with the gate electrode 39 of the switching device SW1. The gate electrode 39 of the switching device SW1 partially overlaps with the first electrode 42 of the second storage device 41. And the first electrode 42 of the second storage device 41 overlaps with the gate electrode 45 of the switching device SW3. All of these overlapping structures are adopted so that charge can be transferred smoothly between these sections.

Next, a method for driving the device 1 will be described with reference to FIGS. 2 and 5. In the following example, an $n^{th}$ row (where n is a positive integer and $1 \leq n \leq N$) of pixels is supposed to have been selected by the vertical shift register 3. The respective times t1 through t6 are indicated on the bottom of FIG. 5.

Figure 5:
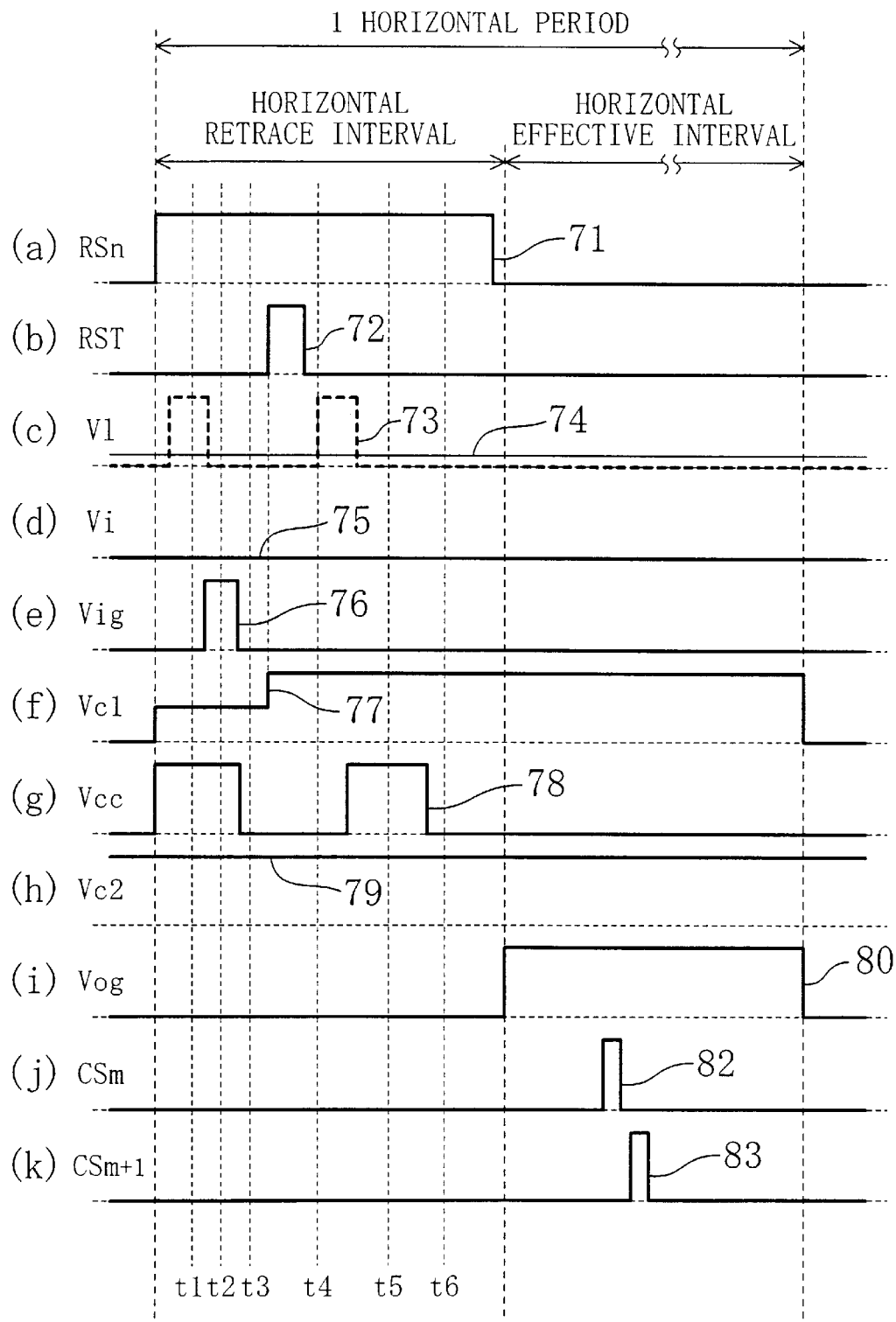
FIG. 5 is a timing diagram illustrating waveforms of respective signals shown in FIG. 2 as for the exemplary operation illustrated in FIG. 3.

First, an $n^{th}$ row selecting pulse RSn shown in portion (a) of FIG. 5 is applied to the row select line 5 for the $n^{th}$ row. The potential on the $n^{th}$ row select line 5 is raised to logically "High" level upon the application of the selecting pulse and kept "High" during a horizontal retrace interval (of a length of about 10 μs, for example), but is kept logically "Low" during the other intervals. As a result, the switching devices 25 of all the pixels 2 connected to the $n^{th}$ row select line 5 turn ON, and the respective selected pixels 2 are connected to associated vertical signal lines 6. At this point in time, each of the photodiodes 21 in the selected pixels 2 has stored thereon carriers in a quantity corresponding to that of light received and is in the second potential state. The $n^{th}$ row selecting pulse is applied to sense the respective second potential states at the storage sections within all the pixels 2 belonging to the $n^{th}$ row. In response to the application of the $n^{th}$ row selecting pulse, the number M of source follower circuits, each being made up of a driver 23 for a pixel 2 on the $n^{th}$ row and an $m^{th}$ column (where m is a positive integer and $1 \leq m \leq M$) and a load device 27 for the $m^{th}$ column, are activated substantially simultaneously. As a result, the respective outputs of the number M of source follower circuits, functioning as sensing circuits, are supplied through associated vertical signal lines 6 to the respective input nodes 30 of associated unit compensators 18, i.e., the respective first electrodes 36 of the first storage devices 35. It should be noted that a voltage V1 with a waveform 74 higher than 0 volts shown in portion (C) of FIG. 5 is continuously applied to the gate electrode 29 of each load device 27. Accordingly, each load device 27 functions as a load for the associated sensing circuit. Alternatively, a voltage with a waveform 74, not the waveform 73, may be applied instead.

A potential with a waveform 72 illustrated as a "reset pulse RST" in portion (b) of FIG. 5 is applied to the reset line 4. As a result, the carriers, which have been stored in each photodiode 21 on the row, are reset, thereby restoring the first potential state in the photodiode 21. Before the reset pulse with the waveform 72 shown in portion (b) of FIG. 5 is applied to the reset line 4, a series of operations of opening and closing the switching devices SW1 through SW3 are performed at the respective times already described with reference to FIG. 3. Hereinafter, these operations will be detailed.

First, the potential Vi with a waveform 75 shown in portion (d) of FIG. 5 is applied to the charge supply node 31 functioning as the source region of the switching device SW2, thereby keeping the surface potential of the charge supply node 31 at $\phi 0$.

The potential Vig with a waveform 76 shown in portion (e) of FIG. 5 is applied to the gate electrode of the switching device SW2. The potential Vig is logically "High" at the time t2.

The potential Vc1 with a waveform 77 varying as shown in portion (f) of FIG. 5 is applied to the first electrode 36 of the first storage device 35. The potential Vc1 corresponds to the signal potential $\phi s$ variable with the quantity of light incident on the pixel until the reset pulse 72 is applied to the gate electrode of the resetting device 24. On and after the reset pulse 72 is applied to the gate electrode of the resetting transistor 24, the potential Vc1 changes into the reset potential $\phi r$.

The potential Vcc with a waveform 78 shown in portion (g) of FIG. 5 is applied to the gate electrode 39 of the switching device SW1. The potential Vcc is initially logically "High" to turn the switching device SW1 ON, but decreases to logically "Low" level before the time t3, thereby turning the switching device SW1 OFF. Then, the potential Vcc rises to logically "High" level again before the time t5 to turn the switching device SW1 ON. And the potential Vcc decreases to logically "Low" level again before the time t6 to turn the switching device SW1 OFF.

The fixed potential Vc2 with a waveform 79 shown in portion (h) of FIG. 5 is continuously supplied to the first electrode 42 of the second storage device 41. Accordingly, the first electrode 42 continues to apply a constant electric field to the surface region facing the electrode 42.

The potential Vog with a waveform 80 shown in portion (i) of FIG. 5 is applied to the gate electrode 45 of the switching device SW3. The potential Vog is initially at logically "Low" level to keep the switching device SW3 OFF. After a series of operations from the time t1 to the time t6 are over, the potential Vog rises to logically "High" level, thereby turning the switching device SW3 ON.

After the horizontal retrace interval is over, the information stored on all the pixels 2 on the selected $n^{th}$ row is sequentially output column by column, i.e., in the order of $1^{st}$, $2^{nd}$, ... and $M^{th}$ columns, while the switching device SW3 is ON, i.e., during a horizontal effective interval (of a length of about 50 μs, for example). Selecting pulses (CSm) 82 and (CSm+1) 83 (with a pulse width in the range from about 50 to about 500 ns, for example) for turning ON the switching devices 9 on the $m^{th}$ and $(m+1)^{st}$ columns are illustrated in portions (j) and (k) of FIG. 5, respectively. These selecting pulses are sequentially output from the horizontal shift register 7. When the switching device 9 on the $m^{th}$ column turns ON, the charge, which has been stored in the n-type doped layer 46, i.e., the output node of the unit compensator 18 associated with the $m^{th}$ column, is supplied to the inverting input terminal of the operational amplifier 43. As a result, a voltage corresponding to the amount of the current flowing is supplied as a signal to the output terminal 44 of the operational amplifier 43 so as to equalize the potentials at the inverting and non-inverting input terminals of the operational amplifier 43. It should be noted that the output terminal 44 of the operational amplifier 43 is connected to the inverting input terminal thereof via an integrating capacitor and a resetting transistor. An output amplifier 11 with such a configuration is often used as a current-to-voltage converter. By holding information as charge, performing a compensation operation for the charge and then operating the output amplifier 11 using the charge in this manner, output can be supplied faster than a device of the type holding information as "potentials" and transmitting them to the last stage thereof.

After all the information required has been output from all the pixels included in a single row and associated with all the columns, the same operation is performed on another row.

The output amplifier 11 does not have to include the operational amplifier 43 as shown in FIG. 2. Alternatively, the output amplifier 11 may be implemented as a source follower, in which the horizontal signal line 10 is connected to an input gate electrode.

As can be understood from the foregoing description, the first and second storage devices 35 and 41 preferably have capacitances large enough to hold and store a sufficient quantity of charge at least during one horizontal effective interval (of a length of about 50 μs). In this embodiment, the capacitance of each storage device 35, 41 is defined within the range from 0.1 to 0.5 pF. A capacitor using an oxide film as a capacitive insulating film may be used as the storage device 35, 41. Alternatively, if a thermal oxide film is used as the oxide film for the capacitor, then the variation in capacitance can be very small. The first electrodes 36 and 42 of these storage devices are preferably formed by a different process from the gate electrode 22 and so on of the MOS transistor functioning as the amplifier such that the thickness of the capacitive insulating film is freely selectable. Thus, required capacitance is ensured without increasing the areas of the first electrodes 36 and 42 so much.

As represented by Equations (1) through (4), so long as a charge quantity Q is proportional to a potential difference i.e., ($\phi s-\phi 0$), ($\phi d-\phi 0$), etc., the variation in threshold voltage can be compensated for. The charge quantity $\Delta Q$ of the output is maximized when the capacitance C1 of the first storage device 35 is equal to the capacitance C2 of the second storage device 41.

According to this embodiment, none of the switching devices SW1 through SW5 operates in quasi-inverted state during the charge transfer. Thus, charge can be transferred stably even when the quantity of light received is small. Therefore, according to this embodiment, even if the characteristics of the storage sections are non-uniform, it is possible to read out information more accurately and rapidly from the storage sections by precisely compensating for the effects produced by the variation irrespective of the quantity of light received.

It should be noted that the switching devices within the unit compensator 18, as well as other switching devices, are preferably MOS transistors.

Figure 6:
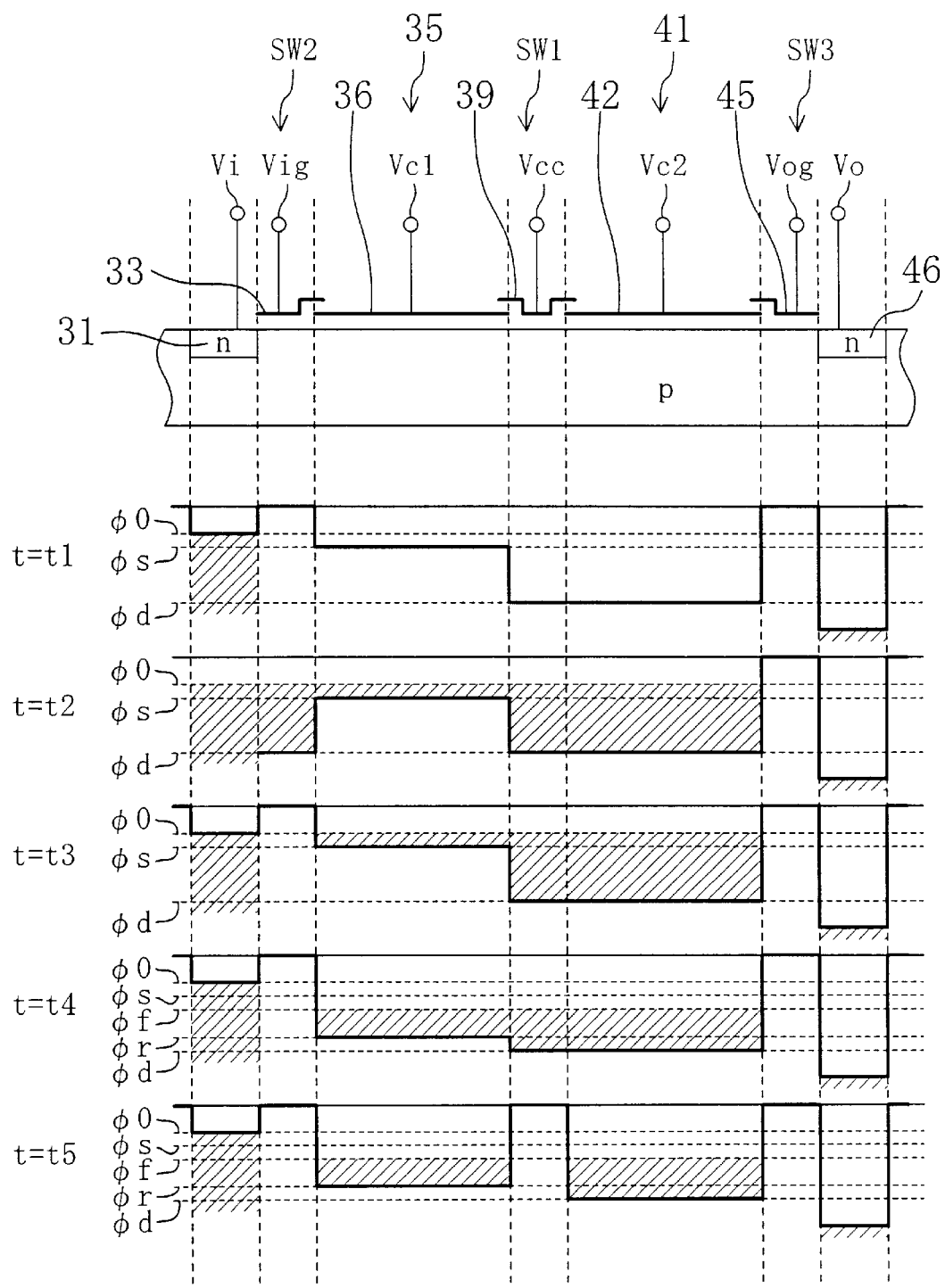
FIG. 6 illustrates a modified example of the operation illustrated in FIG. 3.
Figure 7:
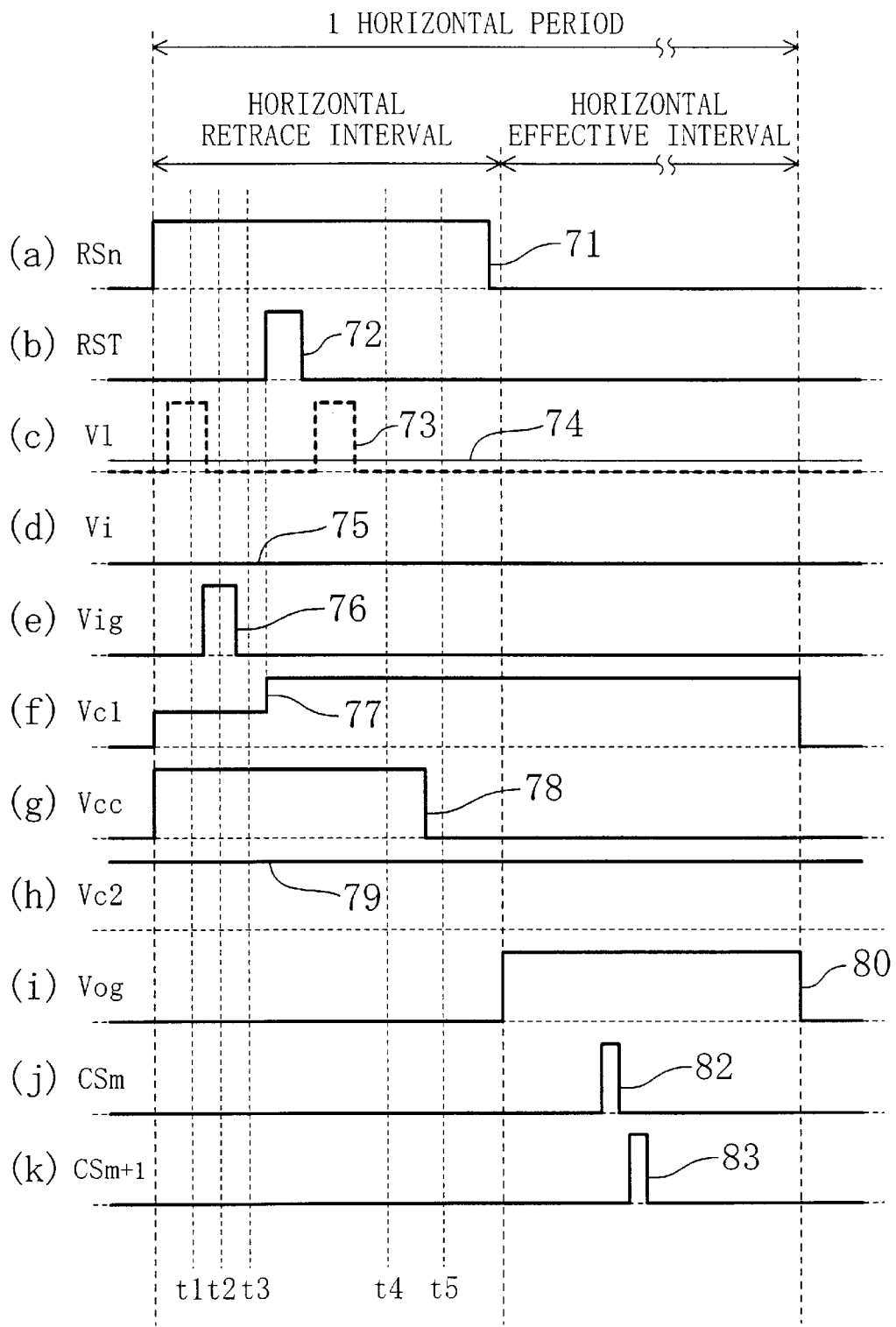
FIG. 7 is a timing diagram illustrating waveforms of the respective signals shown in FIG. 2 as for the exemplary operation illustrated in FIG. 6.

In an alternate embodiment, at the times t3 and t4 shown in FIGS. 3 and 5, the switching device SW1 may be kept ON as shown in FIGS. 6 and 7. In the embodiment shown in FIGS. 6 and 7, since the number of times of signal transition can be reduced, the time taken to perform a series of driving operations can be shortened.

EMBODIMENT 2

Next, an amplifying solid-state imaging device according to another embodiment of the present invention will be described with reference to FIG. 8. Like FIG. 3 according to the first embodiment, FIG. 8 also schematically illustrates a cross section of a region of the silicon substrate where the unit compensator is formed and surface potential profiles in that region. The imaging device according to the second embodiment has substantially the same configuration as the first embodiment except for the unit compensator. Thus, the description of those common features will be omitted herein.

The unit compensator according to the second embodiment supplies and extracts charge by using the n-type doped layer 46 for both operations. Therefore, the device of the second embodiment is provided with neither the charge supply node 31 nor the switching device SW2. A p-type doped layer 47 of the same conductivity type as the silicon substrate is formed in the vicinity of the first storage device 35 and grounded. Thus, the potential at the p-type doped layer 47 is kept constant at any time as shown in FIG. 8.

Hereinafter, a method for driving the imaging device according to the second embodiment will be described. First, at a time t11 or before, the switching device SW1 is turned ON, thereby electrically connecting the respective second electrodes of the first and second storage devices 35 and 41 with respective capacitances C1 and C2 through a surface region of the silicon substrate. As a result, charge can be transferred between these electrodes. At this point in time, the switching devices SW3 is kept OFF.

At the time t11, a surface region of the silicon substrate facing the first electrode of the first storage device 35 shows a potential $\phi s$, while another surface region of the silicon substrate facing the first electrode of the second storage device 41 shows a potential $\phi d$. On the other hand, since the fixed potential is supplied to the n-type doped layer 46 functioning as the charge supply node according to the second embodiment, the surface potential of the n-type doped layer 46 is held at the reference potential $\phi 0$.

Next, at a time t12, the switching device SW3 is turned ON. At this point in time, the switching device SW1 is kept ON. As a result, charge is supplied from the n-type doped layer 46 to both the first and second storage devices 35 and 41. In this respect, the device according to the second embodiment is greatly different in operation from the device according to the first embodiment.

Subsequently, at a time t13, the switching device SW1 is turned OFF. At this point in time, the switching device SW3 is kept ON. As a result, charge in a quantity Q1 proportional to the potential difference ($\phi$s–$\phi$0) between the signal potential $\phi$s and the reference potential $\phi$0 is stored on the first storage device 35.

Then, at a time t14, the switching device SW3 is turned OFF. As a result, charge in a quantity Q2 proportional to a potential difference ($\phi$d–$\phi$0) between the fixed potential $\phi$d and the reference potential $\phi$0 is stored on the second storage device 41.

A time t15 is a certain point in time when a resetting pulse is being applied (or just after the pulse has been applied) during the horizontal retrace interval. The signal potential supplied to the input node of the unit compensator at the time t15 is a value obtained by getting the first potential state at the photodiode 21 within an associated pixel 2 sensed by the sensing circuit. When the signal potential is supplied to the first electrode of the first storage device 35 through the vertical signal line 6, a surface region of the silicon substrate facing the first electrode of the first storage device 35 increases its level from $\phi$s to $\phi$r. At the time t15, the switching devices SW1 and SW3 are both kept OFF. Accordingly, the first storage device 35 still retains the charge Q1 without being provided with any charge from anywhere, although the potential at the first electrode changes.

Subsequently, at a time t16, only the switching device SW1 is turned ON. As a result, part of the charge Q2 that has been stored on the second storage device 41 is transferred to the first storage device 35, and the surface potential of the silicon substrate becomes $\phi$f.

Then, at a time t17, the switching device SW1 is turned OFF again. As a result, charges in respective quantities Q1' and Q2' are stored on the first and second storage devices 35 and 41, respectively. Equation (7) is met for the charge quantity Q2'. Accordingly, if the quantity Q2' of charge stored on the second storage device 41 is sensed at the output amplifier 11 by turning the switching devices SW3, SW5 and 9 ON, then an output proportional to ($\phi$r–$\phi$s) can be obtained as described in the first embodiment.

According to the second embodiment, the n-type doped layer 31, the gate electrode 33 and its line as required by the first embodiment can be omitted, thus advantageously simplifying the configuration.

Figure 8:
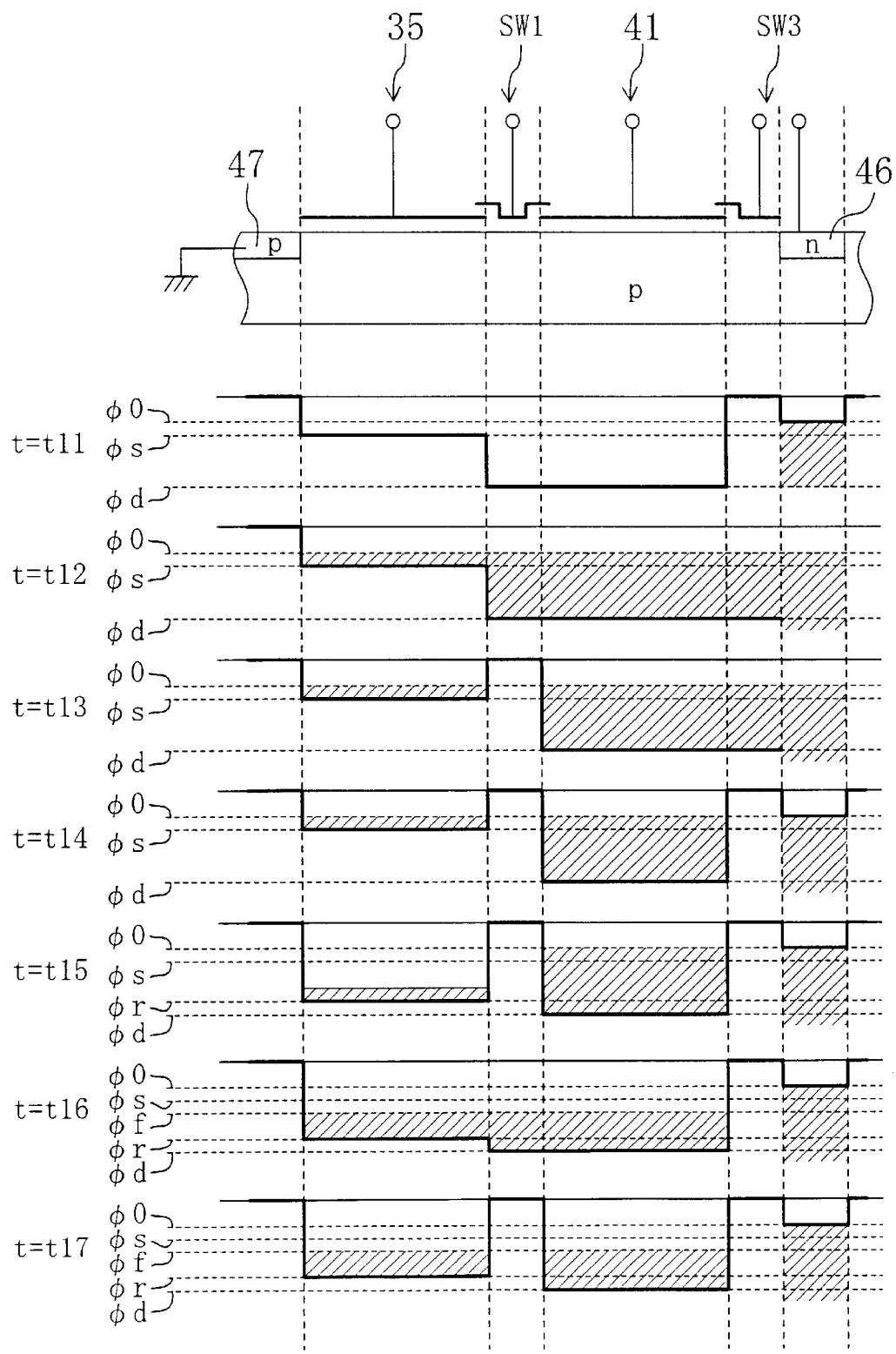
FIG. 8 illustrates another exemplary operation of the unit compensator shown in FIG. 2.
Figure 9:
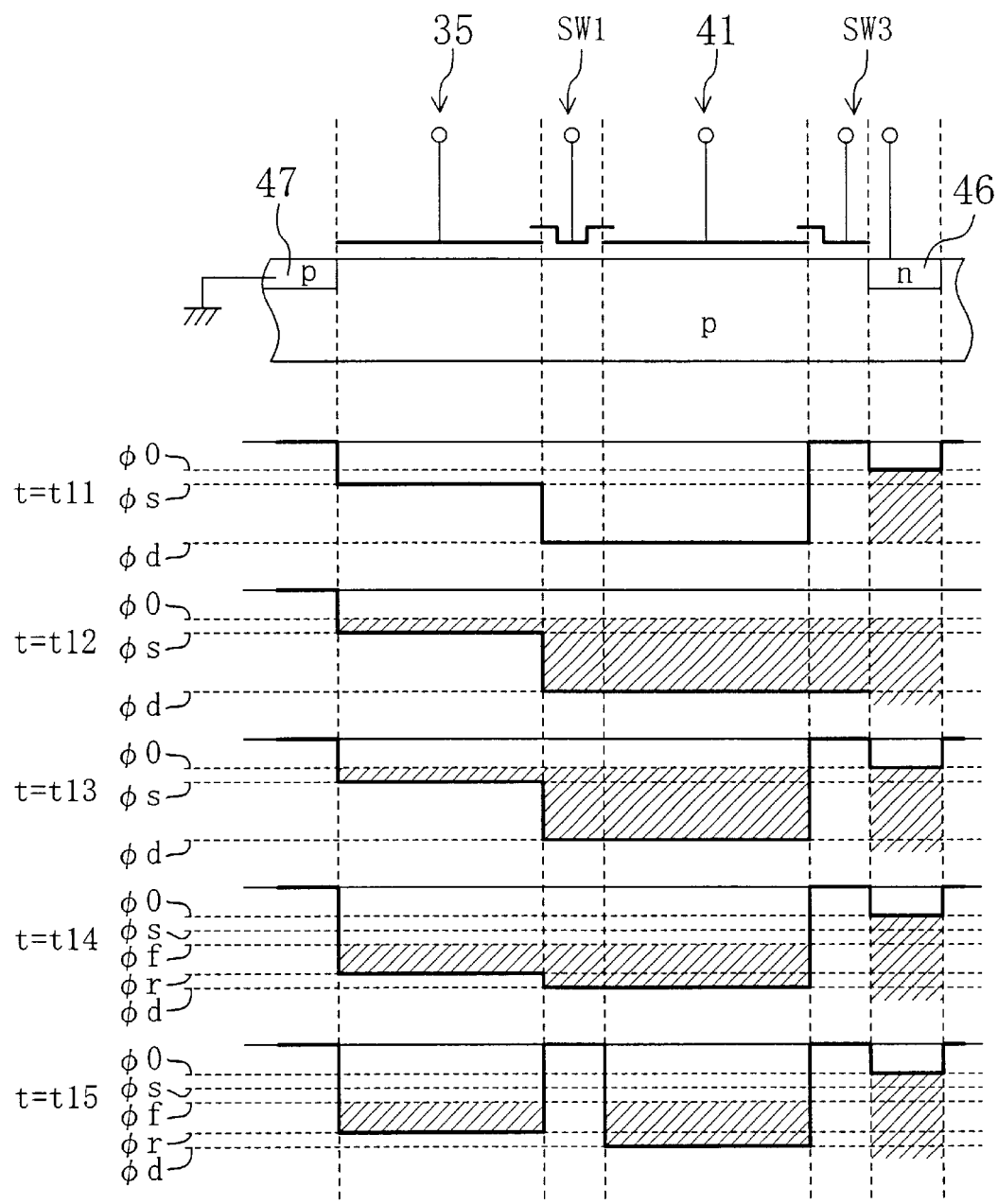
FIG. 9 illustrates a modified example of the operation illustrated in FIG. 8.

In an alternate embodiment, from the time t13 through the time t15 shown in FIG. 8, the switching device SW1 may be kept ON as shown in FIG. 9. In the embodiment shown in FIG. 9, since the number of times of signal transition can be reduced, the time taken to perform a series of driving operations can be shortened.

A shift register is used in the foregoing illustrative embodiments as a selector for accessing a particular pixel 2. Alternatively, any other selector with some accessing function, such as a decoder, may be used instead of the shift register. Also, in the foregoing embodiments, a reset pulse is output from a vertical shift register outputting a selecting pulse for selecting a particular row. Optionally, a shift register, decoder or the like for outputting a reset pulse and a shift register, decoder or the like for selecting a particular row may be separately disposed in different regions within the imaging area.

In the foregoing embodiments, a control electrode partially overlaps with an associated electrode of a storage device in their boundary region. Thus, a known two-layer polysilicon structure should be formed in such a case. Alternatively, the imaging device is still operable even if a small gap, not the overlapped portion, is provided between these electrodes. Such a structure is implementable as a single-layer polysilicon structure. Also, the operation might be stabilized if an n-type doped layer is formed to fill in the gap.

In the foregoing embodiment, the present invention has been described as being applied to a device in which pixels are arranged in columns and rows. Alternatively, the pixels may be arranged in any other fashion. For example, the pixels may be arranged in line or to wobble, i.e., to form a hound's-tooth check pattern. Also, these pixels are not necessarily arranged in a plane, but may be arranged on a curved face.

If other converters, showing different potential states responsive to any other physical quantity, are provided for these unit regions instead of the photoelectric transducers, then the device can sense the spatial distribution of the physical quantity. For example, if pressure sensors, X-ray sensors or the like are formed within the information storage sections, then the device of the present invention can sense the distribution of pressure or X-rays.

What is claimed is:

1. An amplifying solid-state imaging device comprising:
a photoelectric transducing section changing from a first potential state corresponding to a reset operation into a second potential state variable with an intensity of incident light or vice versa;
an amplifier for sensing the first and second potential states of the photoelectric transducing section, thereby outputting first and second signals, respectively; and
a compensator for receiving the first and second signals from the amplifier and outputting a third signal,
wherein the compensator includes:
a first storage device implemented as an MOS capacitor with first and second electrodes;
a second storage device implemented as another MOS capacitor with first and second electrodes;
means for applying a fixed potential to the first electrode of the second storage device;
a switching device for electrically connecting or disconnecting the second electrodes of the first and second storage devices to/from each other;
means for applying a signal potential, corresponding to the second signal, to the first electrode of the first storage device;
means for supplying charge to the respective second electrodes of the first and second storage devices such that the same reference potential is applied to the second electrodes of the first and second storage devices;
means for applying a reset potential, corresponding to the first signal, to the first electrode of the first storage device instead of the signal potential;
means for turning the switching device ON such that while the reset and fixed potentials are applied to the first electrodes of the first and second storage devices, respectively, charge is transferred between the respective second electrodes of the first and second storage devices to equalize potentials at the respective second electrodes of the first and second storage devices with each other; and means for outputting the third signal, corresponding to a quantity of charge stored on the second storage device, with the switching device turned OFF after the charge has been transferred.

2. The imaging device of claim 1, wherein the switching device is implemented as an MOS transistor with a gate electrode, and wherein the gate electrode of the switching device partially overlaps with the respective first electrodes of the first and second storage devices.

3. The imaging device of claim 2, wherein the gate electrode of the switching device and the respective first electrodes of the first and second storage devices are formed out of respective polysilicon films deposited over a silicon substrate with an insulating film interposed therebetween.

4. The imaging device of claim 1, wherein the charge supply means includes means for supplying the charge to the second electrode of the second storage device through the second electrode of the first storage device while the switching device is turned ON.

5. The imaging device of claim 1, wherein the charge supply means includes means for supplying the charge to the second electrode of the first storage device through the second electrode of the second storage device while the switching device is turned ON.

6. The imaging device of claim 1, wherein the amplifier is an amplifying transistor, the current drivability of which is variable with the potential state of the photoelectric transducing section, and wherein the imaging device further comprises a load device for generating potential signals, corresponding to a current flowing through the amplifying transistor, as the first and second signals.

7. The imaging device of claim 1, wherein the first electrodes of the first and second storage devices are formed by a different process from an electrode of the amplifier.

8. An amplifying solid-state imaging device comprising:
a plurality of pixels arranged in a number N of rows by a number M of columns, where N and M are both positive integers equal to or larger than one and at least one of N and M is equal to or larger than two,
each said pixel including
  a photoelectric transducing section changing from a first potential state corresponding to a reset operation into a second potential state variable with an intensity of incident light or vice versa and
  an amplifier for sensing the first and second potential states of the photoelectric transducing section, thereby outputting first and second signals, respectively;
row selecting means for selecting the number M of pixels belonging to a predetermined one of the number N of rows;
column selecting means for selecting the number N of pixels belonging to a predetermined one of the number M of columns; and
the number M of unit compensators, each said unit compensator receiving the first signals and the second signals from the respective amplifiers associated with the selected number N of pixels belonging to the predetermined column, and outputting respective third signals,
wherein each said unit compensator includes:
  a first storage device implemented as an MOS capacitor with first and second electrodes;
  a second storage device implemented as another MOS capacitor with first and second electrodes;
  means for applying a fixed potential to the first electrode of the second storage device;
  a switching device for electrically connecting or disconnecting the second electrodes of the first and second storage devices to/from each other;
  means for applying a signal potential, corresponding to the second signal, to the first electrode of the first storage device;
  means for supplying charge to the respective second electrodes of the first and second storage devices such that the same reference potential is applied to the second electrodes of the first and second storage devices;
  means for applying a reset potential, corresponding to the first signal, to the first electrode of the first storage device instead of the signal potential;
  means for turning the switching device ON such that while the reset and fixed potentials are applied to the first electrodes of the first and second storage devices, respectively, charge is transferred between the respective second electrodes of the first and second storage devices to equalize potentials at the respective second electrodes of the first and second storage devices with each other; and
  means for outputting the third signal, corresponding to a quantity of charge stored on the second storage device, with the switching device turned OFF after the charge has been transferred.

9. A method for driving an amplifying solid-state imaging device,
the device comprising:
  a photoelectric transducing section changing from a first potential state corresponding to a reset operation into a second potential state variable with an intensity of incident light or vice versa;
  an amplifier sensing the first and second potential states of the photoelectric transducing section, thereby outputting first and second signals, respectively; and
  a compensator for receiving the first and second signals from the amplifier and outputting a third signal,
wherein the compensator includes: a first storage device implemented as an MOS capacitor with first and second electrodes; a second storage device implemented as another MOS capacitor with first and second electrodes; and a switching device for electrically connecting or disconnecting the second electrodes of the first and second storage devices to/from each other,
the method comprising the steps of:
  applying a fixed potential to the first electrode of the second storage device;
  getting the second potential state at the photoelectric transducing section sensed by the amplifier;
  applying a signal potential, corresponding to the second signal output from the amplifier that has sensed the second potential state, to the first electrode of the first storage device;
  supplying charge to the respective second electrodes of the first and second storage devices such that the same reference potential is applied to the second electrodes of the first and second storage devices;
  getting the first potential state at the photoelectric transducing section sensed by the amplifier;
  applying a reset potential, corresponding to the first signal output from the amplifier that has sensed the first potential state, to the first electrode of the first storage device;

turning the switching device ON such that while the reset and fixed potentials are applied to the first electrodes of the first and second storage devices, respectively, charge is transferred between the respective second electrodes of the first and second storage devices to equalize potentials at the respective second electrodes of the first and second storage devices with each other; and outputting the third signal, corresponding to a quantity of charge stored on the second storage device, with the switching device turned OFF after the charge has been transferred.

10. The method of claim 9, further comprising the step of making the second storage device depleted after the third signal has been output.

11. A method for driving an amplifying solid-state imaging device, the device comprising:

a plurality of pixels arranged in a number N of rows by a number M of columns, where N and M are both positive integers equal to or larger than one and at least one of N and M is equal to or larger than two, each said pixel including a photoelectric transducing section changing from a first potential state corresponding to a reset operation into a second potential state variable with an intensity of incident light or vice versa and an amplifier for sensing the first and second potential states of the photoelectric transducing section, thereby outputting first and second signals, respectively;

row selecting means for selecting the number M of pixels belonging to a predetermined one of the number N of rows;

column selecting means for selecting the number N of pixels belonging to a predetermined one of the number M of columns; and the number M of unit compensators, each said unit compensator receiving the first signals and the second signals from the respective amplifiers associated with the selected number N of pixels belonging to the predetermined column, and outputting respective third signals, wherein each said unit compensator includes:

a first storage device implemented as an MOS capacitor with first and second electrodes;

a second storage device implemented as another MOS capacitor with first and second electrodes; and a switching device for electrically connecting or disconnecting the second electrodes of the first and second storage devices to/from each other, the method comprising the steps of:

applying a fixed potential to the first electrode of each said second storage device;

getting the predetermined one of the number N of rows selected by the row selecting means;

getting the second potential states at the number M of photoelectric transducing sections belonging to the selected row sensed by the number M of amplifiers belonging to the selected row;

applying a signal potential, corresponding to the second signal output from each said amplifier that has sensed the second potential state, to the first electrode of the associated first storage device;

supplying charge to the respective second electrodes of the first and second storage devices such that the same reference potential is applied to the second electrodes of the first and second storage devices;

getting the first potential states at the number M of photoelectric transducing sections belonging to the selected row sensed by the number M of amplifiers belonging to the selected row;

applying a reset potential, corresponding to the first signal output from each said amplifier that has sensed the first potential state, to the first electrode of the associated first storage device;

turning each said switching device ON such that while the reset and fixed potentials are applied to the first electrodes of the associated first and second storage devices, respectively, charge is transferred between the respective second electrodes of the first and second storage devices to equalize potentials at the respective second electrodes of the first and second storage devices with each other; and sequentially outputting the third signals, corresponding to quantities of charge stored on the respective second storage devices, with the switching devices turned OFF after the charge has been transferred.

* * * * *

UNITED STATES PATENT AND TRADEMARK OFFICE
CERTIFICATE OF CORRECTION

PATENT NO. : 6,677,997 B1
DATED : January 13, 2004
INVENTOR(S) : Takao Kuroda et al.

It is certified that error appears in the above-identified patent and that said Letters Patent is hereby corrected as shown below:

<u>Title page,</u>
Item [56], References Cited, FOREIGN PATENT DOCUMENTS,
change "JP 247535" to -- JP 9-247535 --; and delete "JP 247353"

Signed and Sealed this

Twentieth Day of July, 2004

JON W. DUDAS
*Acting Director of the United States Patent and Trademark Office*